US005635619A

United States Patent [19]

Udpa et al.

[11] Patent Number: 5,635,619

[45] Date of Patent: Jun. 3, 1997

[54] APPARATUS AND METHOD FOR DRIVING AN ULTRASONIC TRANSDUCER

[75] Inventors: Satish S. Udpa, Ames, Iowa; Srivatsa Vasudevan, San Jose, Calif.

[73] Assignee: Iowa State University Research Foundation, Inc., Ames, Iowa

[21] Appl. No.: 273,725

[22] Filed: Jul. 12, 1994

[51] Int. Cl.$^6$ .............................. G01L 25/00; G01L 27/00

[52] U.S. Cl. .............................. 73/1.82; 73/DIG. 1

[58] Field of Search .............................. 73/1 DV, DIG. 1, 73/DIG. 4, 432.1; 310/316

[56] References Cited

U.S. PATENT DOCUMENTS

| | | | |
|---|---|---|---|
| 3,638,087 | 1/1972 | Ratcliff | 318/118 |
| 4,043,175 | 8/1977 | Fredriksson et al. | 73/1 DV |
| 4,566,330 | 1/1986 | Fujii et al. | 73/1 DV |
| 4,694,699 | 9/1987 | Cheeke | 73/606 |
| 4,954,960 | 9/1990 | Lo et al. | 318/116 |
| 4,970,656 | 11/1990 | Lo et al. | 73/589 |
| 5,103,675 | 4/1992 | Komninos | 73/592 |
| 5,406,503 | 4/1995 | Williams, Jr. et al. | 73/579 |

FOREIGN PATENT DOCUMENTS

| | | |
|---|---|---|
| 0270819 | 6/1988 | European Pat. Off. . |

OTHER PUBLICATIONS

PCT International Search Report dated Oct. 17, 1995, completed by Examiner Anderson; 6 pages.

S.P. Cheney et al., "Step Excitation Source for Ultrasonic Pulse Transducers", *Ultrasonics*, pp. 111–113, May, 1973.

A.F. Brown et al., "Generation and Reception of Wideband Ultrasound", *Ultrasonics*, pp. 161–167, Jul. 1974.

T. G. Winter et al., "On Driving a Transducer to Produce Pulses Shorter Than the Natural Period of the Transducer", *Ultrasonics*, pp. 110–112, May 1975.

M.G. Silk, "Determination of Crack Penetration Using Ultrasonic Surface Waves", *NDT International*, vol. 9, No. 6, pp. 290–297, Dec. 1976.

C.N. Davey, "The Ultrasonic Interference Micrometer", *Ultrasonics*, pp. 103–106, Apr. 1968.

H.L. Whaley et al., "Ultrasonic Frequency Analysis", *Materials Evaluation*, vol. 28, No. 3, pp. 61–66, 1970.

G.R. Lockwood et al., "The Design of Protection Circuitry for High-Frequency Ultrasound Imaging Systems", *IEEE Transactions on Ultrasonics, Ferroelectrics and Frequency Control*, vol. 38, No. 1, pp. 48–55, Jan. 1991.

J.L. Dion et al., "Practical Ultrasonic Spectrometric Measurement of Solution Concentrations by a Tracking Technique", *IEEE Transactions on Ultrasonic, Ferroelectrics and Frequency Control*, vol. 37, No. 2, pp. 190–195, May 1990.

(List continued on next page.)

*Primary Examiner*—Hezron E. Williams
*Assistant Examiner*—Richard A. Moller
*Attorney, Agent, or Firm*—Schwegman, Lundberg, Woessner & Kluth, P.A.

[57] ABSTRACT

A method and apparatus for electronically driving an ultrasonic acoustic transducer. The transducer is operable in two modes; in a first mode, the lock-in frequency of the transducer is determined; in a second mode, the lock-in frequency determined in the first mode is used to modulate a tone-burst pulse to drive the transducer in an efficient manner. Operating in the first mode, the lock-in frequency is determined by exciting the transducer with a series of tone bursts, where each tone burst comprises an electronic pulse modulated by a tone of one frequency selected from a range of frequencies, and measuring the response of the transducer to each tone burst. In an alternative embodiment, the excitation of the transducer in the first mode is provided by a signal whose frequency is swept over a range. The response of the transducer is sampled at various times during the sweep. The lock-in frequency is chosen by examining the responses and choosing the frequency which gives the best response. Operating in the second mode, the transducer is driven with an electronic tone burst generated by modulating said an electronic pulse with a tone of the determined lock-in frequency.

27 Claims, 6 Drawing Sheets

OTHER PUBLICATIONS

D.W. Fitting et al., "Ultrasonic Spectral Analysis for Nondestructive Evaluation", Plenum Press, New York, pp. 5–21, 1981.

A.B. Przedpelski, "Optimize Phase–Lock Loops to Meet Your Needs—Or Determine Why You Can't", *Electronic Design,* vol. 26, No. 19, Sep. 1978 pp. 134–137.

Paul L. Matthews, *Choosing and Using ECL,* McGraw–Hill-Book Company, New York, New York 1983.

B.B. Lee et al., "A New Digital Correlation Flaw Detection System", *Journal of Nondestructive Evaluation,* vol. 2, No. 1, pp. 57–63, 1981.

C.E. Elias, "An Ultrasonic Pseudorandom Signal–Correlation System", *IEEE Transaction on Sonics and Ultrasonics,* vol. Su–27, No. 1, pp. 1–7, Jan. 1980.

"Ultrasonic Pulser–Receiver Operations Manual", Revision 3, Takano Co., Ltd., Jan. 1993.

C.W. Lawrence et al., "Crack Detection in Silicon Nitride by Acoustic Microscopy", *NDT International,* vol. 23, No. 1, pp. 3–10, Feb. 1990.

M.S. Hughes et al., "Design of a Unipolar Pulser Generator and Receiver for Applications to Quantitative NDE", *Review of Progress in Quantitative Nondestructive Evaluation,* vol. 9, pp. 917–925, Plenum Press, New York 1990.

I. Komsky et al., "Self–Calibrating Surface Wave Device to Characters Near–Surface Mechanical Damage", *Review of Progress in Quantitative Nondestructive Evaluation,* vol. 10A, pp. 1095–1102, Plenum Press, New York, 1991.

Naybour, P.J., "Automated Ultrasonic Inspection Using PULSDAT", *The British Institute of Nondestructive Testing,* vol. 34, No. 10, pp. 485–490, Oct. 1992.

G. Nash, Application Note AN–535, "Phase–Locked Loop Design Fundamentals", Motorola Semiconductor Products Inc., Jan. 1990.

B. Broeker, Application Note AN–536, "Micro–T Packaged Transistors for High Speed Logic Systems", Motorola Semiconductor Products Inc., Jan. 1990.

APPARATUS AND METHOD FOR DRIVING AN ULTRASONIC TRANSDUCER

FIELD OF THE INVENTION

The present invention relates to ultrasonic transducers, and more specifically to an apparatus and method for electronically driving an ultrasonic transducer.

BACKGROUND OF THE INVENTION

Ultrasonic testing systems have been designed and built to meet the needs of a variety of applications. One application is non-destructive evaluation, where ultrasonic acoustic energy is applied to an object-being-probed (a "specimen"), and the echo of reflected or scattered acoustic energy, caused by cracks or density differentials, is received and analyzed to reveal the internal and/or surface structure of the specimen.

A typical ultrasonic transducer is a quartz crystal or other piezo-electric device which can convert a high-frequency (i.e. >20,000 Hz) alternating-current electrical signal into a corresponding acoustical signal and vice versa. The transducer is often modeled as a tuned LC (inductance-capacitance) circuit, with one resonant frequency. Real-world transducers can have locally-resonant characteristics at a multiplicity of frequencies. At a resonant frequency, a greater amount of acoustical energy is generated from a given amount of electrical energy (and vice versa) than at other non-resonant frequencies. Any input electrical signal which is not converted into acoustical energy is typically converted into waste heat in the transducer.

One technique for broadening the bandwidth of the resonant frequency is to provide mechanical damping for the transducer.

Acoustic energy is typically coupled from the transducer to the specimen by a coupling medium, often a liquid such as water or oil. The coupling medium is designed to minimize acoustic discontinuities in the path of the acoustic wave which would otherwise lessen the energy transmitted between the transducer and the specimen. Once inside the specimen, the acoustic wave reflects and scatters from cracks and other acoustic transmission discontinuities in the specimen. The acoustic signal thus echoed by the internal features of the specimen is then received by a transducer. If the same transducer is used for both transmission and reception of the acoustic signal, then the system is called a "pitch-catch mode" system; if separate transducers are used for transmission and reception, then the system is called a "pulse-echo mode" system. The received signal is converted back into an electrical signal and then amplified, analyzed, and displayed.

The wavelength of an acoustic wave at a given frequency is a function of the velocity of the wave in the transmission medium.

One type of ultrasonic testing system is the "continuous wave" system. A single-frequency, sine wave (or approximately sine wave) electrical signal at or near the resonant frequency of the transducer is coupled to the transducer, which converts the electrical signal into a corresponding acoustic sine wave. This acoustic wave is coupled to the specimen, and the echo received (typically by a separate transducer) and amplified (typically by a tuned amplifier). The amplitude and phase of the echoed signal is then analyzed. This technique is often used to measure velocities of physical components internal to the specimen (e.g., blood velocity in a vein), or attenuation of the signal due to inhomogeneities. This type of system is simple, relatively inexpensive, and can do quite accurate measurement of velocities using resonance techniques; however, since range information is not available, it is difficult to pinpoint an internal flaw region.

Another type of ultrasonic testing system is the "continuous-wave, swept-frequency" system. A ramp generator drives a variable-frequency oscillator to generate the swept-frequency transmission signal which drives the transmitting transducer. The same ramp generator tunes a variable-frequency tuned amplifier which amplifies the received signal (which is typically received by a separate transducer), which is then analyzed and displayed. This type of system has greater frequency diversity, and can do automated measurements over a range of frequencies; however, since range information is still not available, it is difficult to pinpoint an internal flaw region, and expensive components and broadband transducers are required.

Another type of ultrasonic testing system is the "pulsed single-frequency" system. A single-frequency oscillator is amplitude-modulated with a pulse; the resulting "tone burst" drives the transducer with a few cycles (e.g., ten cycles) of sine wave. Because the tone burst has a beginning and end, it is possible to measure time delay, as well as amplitude and phase information; this allows measurement of depth in the specimen.

Another type of ultrasonic testing system is the "pulsed, swept-frequency" system. A ramp generator drives a variable-frequency oscillator to generate a slowly swept frequency transmission signal, which is amplitude-modulated with a pulse; the resulting "tone burst" drives the transducer with a few cycles (e.g., ten cycles) of sine wave whose frequency continuously varies. The received signal is then amplified, analyzed, and displayed. This type of system has greater frequency diversity, and because the tone burst has a beginning and end, it is also possible to measure time delay as well as amplitude and phase information; this allows measurement of depth in the specimen; however, acquisition of spectra and signals takes a longer time than with other systems, the system is complex, and expensive components and broadband transducers are required.

Yet another type of ultrasonic testing system is the "pulsed, broadband analog" system. Some systems use a single, high-voltage (approximately 100 to 300 volts) pulse with a wide spectrum of frequencies to drive the transducer. Other researchers have suggested that a step-function driver be used rather than the pulse-function driver. The reflected signal is received and amplified. This type of system has good frequency diversity, and because the pulse has a beginning and end, it is also possible to measure time delay as well as amplitude information; this allows measurement of depth in the specimen; however, phase information is difficult to extract, the system is complex, and expensive hazard-reduction precautions may be required for the high-voltage pulse. Since the transducer acts like a tuned L-C circuit, much of the energy of frequency components outside the resonant frequencies of the transducer goes into waste heat.

None of the above systems provide particularly efficient conversion of electrical energy into acoustical energy (and vice versa) combined with the ability to measure time delay. Some methods involve driving the transducer with voltage signals which can be dangerous in a medical environment. Other methods use a continuous-wave signal which is not very useful in echo-location of interior structures of the item being investigated. What is needed is a method and apparatus which maximize signal conversion, minimize voltages to the transducer, and facilitate measurement of phase shift, time delay, and signal attenuation in the specimen.

SUMMARY OF THE INVENTION

The present invention provides a method for electronically driving an ultrasonic acoustic transducer. The method is operable in two modes; operating in a first mode, a lock-in frequency is determined by exciting the transducer with a series of tone bursts, where each tone burst comprises an electronic pulse modulated by a tone of a single frequency selected from a range of frequencies, and measuring the response of the transducer to each tone-burst. The lock-in frequency is then chosen by examining these responses and choosing the frequency which gives the best response. Operating in a second mode, the transducer is driven with an electronic tone burst generated by modulating an electronic pulse with a tone of the determined lock-in frequency.

In an alternative embodiment, the excitation of the transducer in the first mode is provided by a signal whose frequency is swept over a range. The response of the transducer is sampled at various times during the sweep of frequencies.

The response can be measured in any suitable manner, such as measuring the voltage across the transducer, the current into the transducer, or the acoustic output of the transducer.

According to another aspect of the present invention, a transducer driver apparatus is described which operates at the lock-in frequency of an ultrasonic acoustic transducer in order to more efficiently transfer energy from an electrical to an acoustic signal. The transducer driver apparatus is operable in two modes. Operating in a first mode, the apparatus determines the lock-in frequency of the transducer by exciting the transducer with a series of tone bursts, where each tone burst comprises an electronic pulse modulated by a tone of one frequency selected from a range of frequencies, and measuring the response of the transducer to each tone burst; the lock-in frequency is then chosen by examining the responses and choosing the frequency which gives the best response. Operating in a second mode, the apparatus uses the lock-in frequency determined in the first mode to modulate a tone-burst pulse which drives the transducer.

DESCRIPTION OF THE PREFERRED EMBODIMENT

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

It is desirable for an ultrasonic transducer driver system to drive the transducer with a signal which the transducer can most efficiently convert into acoustic energy. It is also desirable that the signal chosen will allow the system to measure time delay and phase shifts.

Figure 1A:
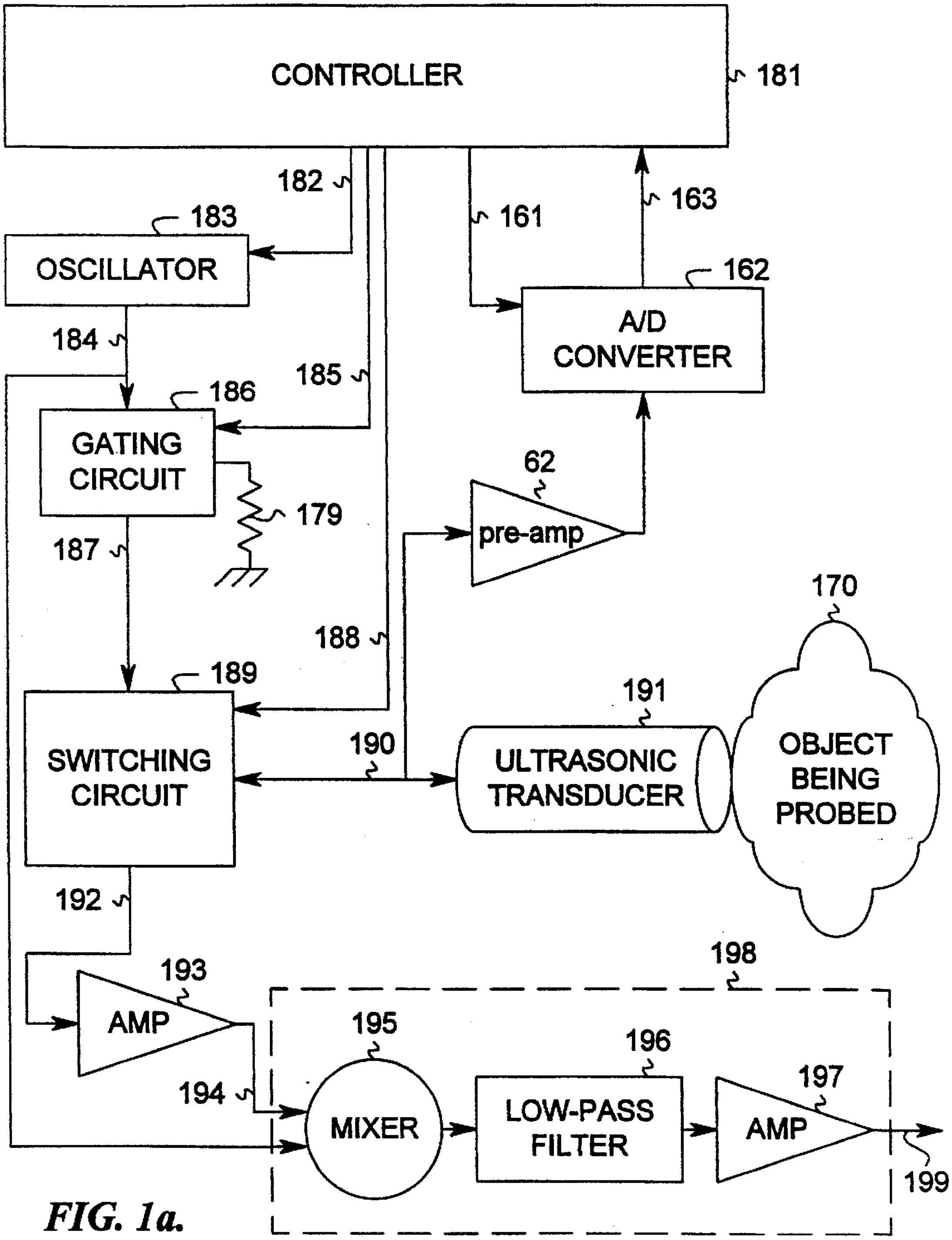
FIG. 1*a* is a block diagram representative of an embodiment of an ultrasonic transducer system according to the invention using a single transducer.
Figure 1B:
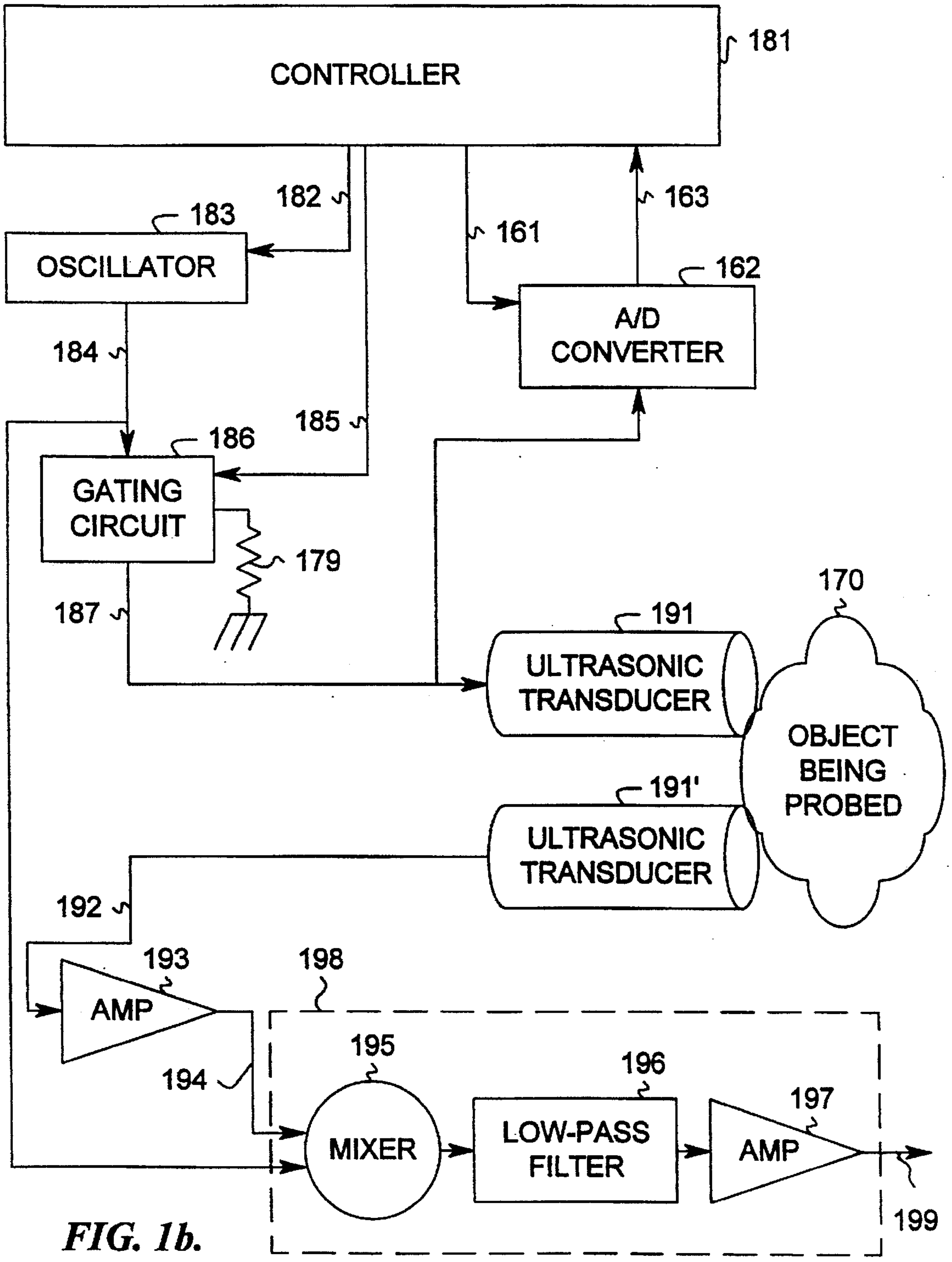
FIG. 1*b* is a block diagram representative of an embodiment of an ultrasonic transducer system according to the invention using separate transmission and reception transducers.

FIG. 1*a* and FIG. 1*b* illustrate embodiments of an ultrasonic transducer system according to the invention. FIG. 1*a* is a block diagram showing an embodiment of the invention which uses a single transducer for both transmission and reception of the ultrasonic acoustic signal. Controller 181 is a general-purpose microcomputer having a memory and operating under control of a stand-alone computer program which is executed to control operation of the invention. In one particular embodiment, controller 181 comprises an IBM PC computer from IBM Corp. of Armonk, N.Y., a GPIB controller card from National Instruments, and an interface card using an Intel i8255 chip from Intel Corp. and plugged into the IBM PC bus.

Oscillator 183 is a variable-frequency signal source capable of (a.) generating a tone signal 184 at a frequency within a range of frequencies, and (b.) responsive to frequency-control signal 182. Controller 181 provides frequency control signal 182 to control the frequency of oscillator 183. In one embodiment, oscillator 183 is a digital phase-locked loop oscillator circuit, and frequency control signal 182 is a digital signal representative of the frequency to be generated.

Gating circuit 186 modulates the amplitude of tone signal 184 in order to generate tone-burst signal 187. Controller 181 provides pulse-control signal 185 to control the timing and inter-pulse period, as well as the shape and duration of tone-burst signal 187. In one embodiment, during a first "pulse" period gating circuit 186 passes approximately 9 cycles of signal 184 to tone-burst signal 187, where each passed cycle is of approximately equal amplitude. The pulse period is followed by a second, much longer, "inter-pulse" period during which essentially no signal is passed to tone-burst signal 187. In one embodiment, during the inter-pulse period, gating circuit 186 couples tone signal 184 to dummy load 179 in order to maintain an even load on oscillator 183 across both the pulse and inter-pulse periods; this even load helps stabilize the output characteristics of oscillator 183.

In one embodiment, during transmission mode, switching circuit 189 acts under control of switching-control signal 188 from controller 181 to couple tone-burst signal 187 to transducer path 190, which is then coupled to ultrasonic transducer 191. At the time of the end of the tone burst, switching circuit 189 changes state to reception mode, disconnecting tone-burst signal 187 from transducer path 190 and coupling the received transducer signal (generated by ultrasonic transducer 191 in response to acoustic stimulation) from transducer path 190 to received signal 192. During transmission mode, ultrasonic transducer 191 converts transmitted tone-burst signal from transducer path 190 into acoustic energy in order that the acoustic energy will enter the object being probed, specimen 170. As the acoustic energy encounters discontinuities or density gradients in specimen 170, some of the energy is scattered or reflected as an echo. During reception mode, this acoustic echo is then received by ultrasonic transducer 191 and converted back into a received transducer signal on transducer path 190; switching circuit 189 now couples the received transducer signal from transducer path 190 to received signal 192 which is amplified by amplifier 193 to generate amplified received signal 194.

Demodulator 198, comprising mixer 195, low-pass filter 196, and amplifier 197, then demodulates amplified received signal 194 to generate output signal 199. Mixer 195 mixes (i.e., multiplies) amplified received signal 194 with tone signal 184; this mixing step emphasizes certain information contained in amplified received signal 194. Such a "product detector" mixer-type detector allows pursuit of additional signal processing options, due to the synchronous detection and the coherent nature of the system. An alternative embodiment uses a standard diode-capacitor detector in place of mixer 195 to perform an asynchronous detection. Additional biasing circuitry may be required if a diode-capacitor detector is employed in mixer 195. If a product detector is used, the result is then passed through low-pass filter 196 which removes the frequency remnants of tone signal 184 as well as any higher-frequency components introduced by mixer 195. The resulting "base-band" signal is then amplified by amplifier 197 to produce base-band output signal 199.

It is an object of the present invention to determine the "lock-in" frequency of ultrasonic transducer 191. This lock-in frequency is the frequency of tone signal 184 at which the maximum energy from the tone-burst signal transmitted on transducer path 190 is converted into acoustic energy by transducer 191. In a first mode, which is used to determine the lock-in frequency, transducer path 190 is also coupled through pre-amp 62 to analog-to-digital converter 162 which measures the voltage of the tone-burst signal transmitted on transducer path 190 and generates digital transducer signal 163 which is representative of the magnitude of the voltage of the tone-burst signal transmitted on transducer path 190; the lock-in frequency is chosen as the frequency of tone signal 184 which creates the minimum voltage across transducer 191 during the tone-burst signal transmitted on transducer path 190. In another embodiment, analog-to-digital converter 162 measures the current of the tone-burst signal transmitted on transducer path 190 and generates digital transducer signal 163 which is representative of the magnitude of the current of the tone-burst signal transmitted on transducer path 190 during the tone burst; the lock-in frequency is the frequency which creates the maximum current into transducer 191. In yet another embodiment, analog-to-digital converter 162 measures the voltage of the received transducer signal on transducer path 190 (during reception mode) and generates digital transducer signal 163 which is representative of the magnitude of the acoustic energy received by ultrasonic transducer 191 as an echo from the acoustic wave created by the tone-burst signal; the lock-in frequency is the frequency of tone signal 184 which creates the maximum echoed acoustic wave.

In an alternative embodiment, the excitation of the transducer in the first mode is provided by a signal whose frequency is swept over a range. Oscillator 183 is swept over a range of frequencies. Gating circuit 186 is turned "on" to continuously couple the swept frequency through switching circuit 189 to ultrasonic transducer 191. The response of the transducer is sampled by A/D converter 162 at various times during the sweep and reported to controller 181 which controls the frequency of oscillator 183.

The selected lock-in frequency of transducer 191 can be, but need not be, one of the frequencies actually used to excite transducer 191 during the first mode; in one embodiment, if enough information is obtained from the response measurements, the lock-in frequency can be selected based on the direction and slope of the frequency-response curve as measured on either side of the predicted lock-in frequency.

Many other embodiments which could be used to measure the conversion of tone-burst-signal energy into acoustic energy will be apparent to those of skill in the art upon reviewing the above description.

In an alternative embodiment shown in FIG. 1*b*, tone-burst signal 187 is directly coupled to ultrasonic transducer 191; a second ultrasonic transducer 191' is used to receive the scattered or reflected acoustic echo and convert it into transducer signal 192. In the embodiment shown, analog-to-digital converter 162 is coupled to measure the voltage of transmitted tone-burst signal 187. Other aspects of FIG. 1*b* are analogous to the description for FIG. 1*a*. In another embodiment (not shown), analog-to-digital converter 162 is coupled to measure the voltage of received signal 192.

Figure 2:
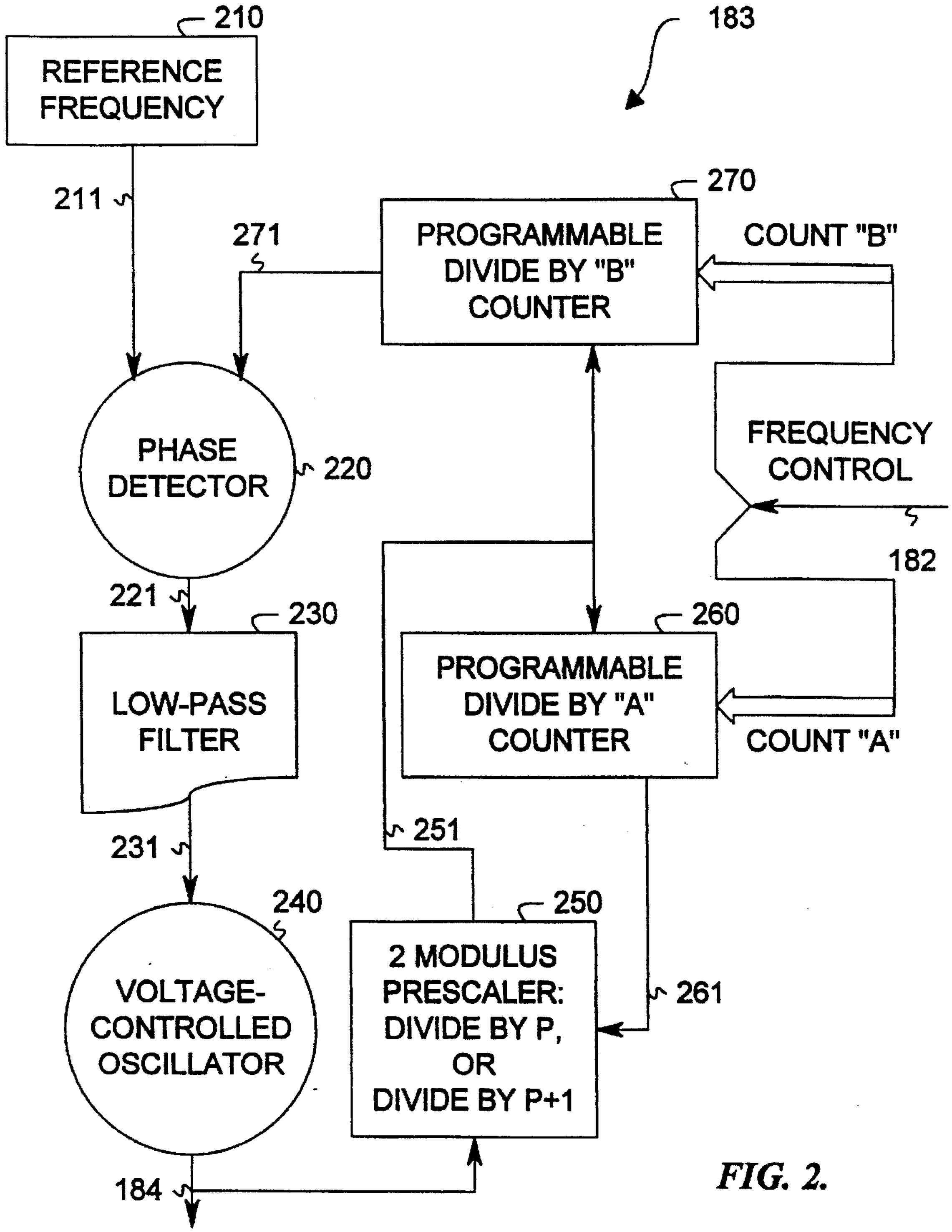
FIG. 2 is a block diagram of a digital phase-locked-loop oscillator which could be used in the ultrasonic transducer system of FIG. 1*a*.

FIG. 2 is a block diagram of a digitally controlled phase-locked-loop oscillator which could be used for oscillator 183 in the ultrasonic transducer system of FIG. 1*a*. Reference-frequency generator 210 provides a reference frequency 211. Phase detector 220 generates a dynamic phase-error signal 221 which is proportional to the phase difference between reference signal 211 and frequency-divided tone signal 271 (described further below). Low-pass filter 230 generates static phase-error signal 231 by filtering dynamic phase-error signal 221 to remove unwanted high-frequency components. Voltage-controlled oscillator 240 generates tone signal 184 whose frequency is a function comprised, inter alia, of static phase-error signal 231. Prescaler 250 divides the frequency of tone signal 184 by one of two divisors to generate intermediate-frequency signal 251 (depending on prescaler-control signal 261, prescaler 250 divides the frequency of tone signal 184 by either divisor P or by divisor P+1).

When reset, programmable divide-by-"A" counter 260, clocked by intermediate frequency signal 251, starts counting down from the digital value COUNT "A" which is set by frequency-control signal 182; at the same time, programmable divide-by-"B" counter 270, also clocked by intermediate-frequency signal 251, starts counting down from the digital value COUNT "B" which is separately set by frequency-control signal 182. Frequency-control signal 182 sets the digital value of COUNT "A" to be smaller than COUNT "B"; neither value is set to zero.

While divide-by-"A" counter 260 is counting, prescaler-control signal 261 specifies that prescaler 250 divides by P+1 (so intermediate-frequency signal 251 has one cycle for every P+1 cycles of tone signal 184). When divide-by-"A" counter 260 reaches zero, it stops counting and prescaler-control signal 261 changes to specify that prescaler 250 divides by P (so intermediate-frequency signal 251 has one cycle for every P cycles of tone signal 184). Prescaler-control signal 261 will continue to specify that prescaler 250 divides by P until divide-by-"B" counter 270 reaches zero. (At this time divide-by-"A" counter 260 reaches zero, (a) divide-by-"B" counter 270 will have decremented "A" times, (b) divide-by-"B" counter 270 will have a value of "B"−"A", and (c) tone signal 184 will have had "A"*(P+1) cycles.) When divide-by-"B" counter 270 reaches zero, it will generate one cycle on frequency-divided tone signal 271. (At the time divide-by-"B" counter 270 reaches zero, divide-by-"B" counter 270 will have decremented an additional "B"−"A" times, during which tone signal 184 will have had an additional ("B"–"A")*(P) cycles.) Frequency-divided tone signal 271 will then reset divide-by-"A" counter 260 and divide-by-"B" counter 270.

The result of this overall loop is that frequency-divided tone signal 271 will have one cycle for every (A*(P+1))+((B–A)*P) cycles of tone signal 184. When the phase-locked loop is operating, it will keep the phase of frequency-divided tone signal 271 locked to the phase of reference-frequency signal 211, and thus tone signal 184 will have a frequency of (A*(P+1))+((B–A)*P) times—i.e., A+(B*P) times—the frequency of reference-frequency signal 211. The frequencies at which oscillator 183 can be set (the "channels" of the phase-locked loop) are thus integer multiples of the frequency of reference-frequency signal 211; the minimum and maximum frequencies of the phase-locked loop are typically determined by the capabilities of the voltage-controlled oscillator 240; the minimum frequency will be at least P+1 times the frequency of reference-frequency signal 211.

In one embodiment, a tone signal 184 voltage of 2 volts peak-to-peak was specified. A frequency range of 500 KHz to 200 MHz was specified. A channel spacing of 10 KHz was specified for frequencies between 500 KHz and 10 MHz, and a channel spacing of 100 KHz was specified for frequencies between 10 MHz and 200 MHz. A lock-in time of 1 millisecond was specified for the phase-locked loop. The prescaler 250, divide-by-"A" counter 260, and divide-by-"B" counter 270 are powered from controller 181, and are optically isolated from the analog section comprising phase detector 220, low-pass filter 230 and voltage-controlled oscillator 240.

In one embodiment, an HP6060B signal generator made by Hewlett Packard Corp. is used for oscillator 183. In an alternative embodiment, any suitable variable-frequency-controlled oscillator can be used for oscillator 183 (such as are illustrated in the books: W. F. Egan, *Frequency Synthesis by Phase Lock*, New York, Wiley, 1981, and W. C. Lindsey & C. M. Chie, *Phase-Locked Loops*, New York, IEEE Press, 1986).

In one embodiment, an HP57410 digitizing oscilloscope from Hewlett Packard Corp. is used for analog-to-digital converter 162.

Figure 3:
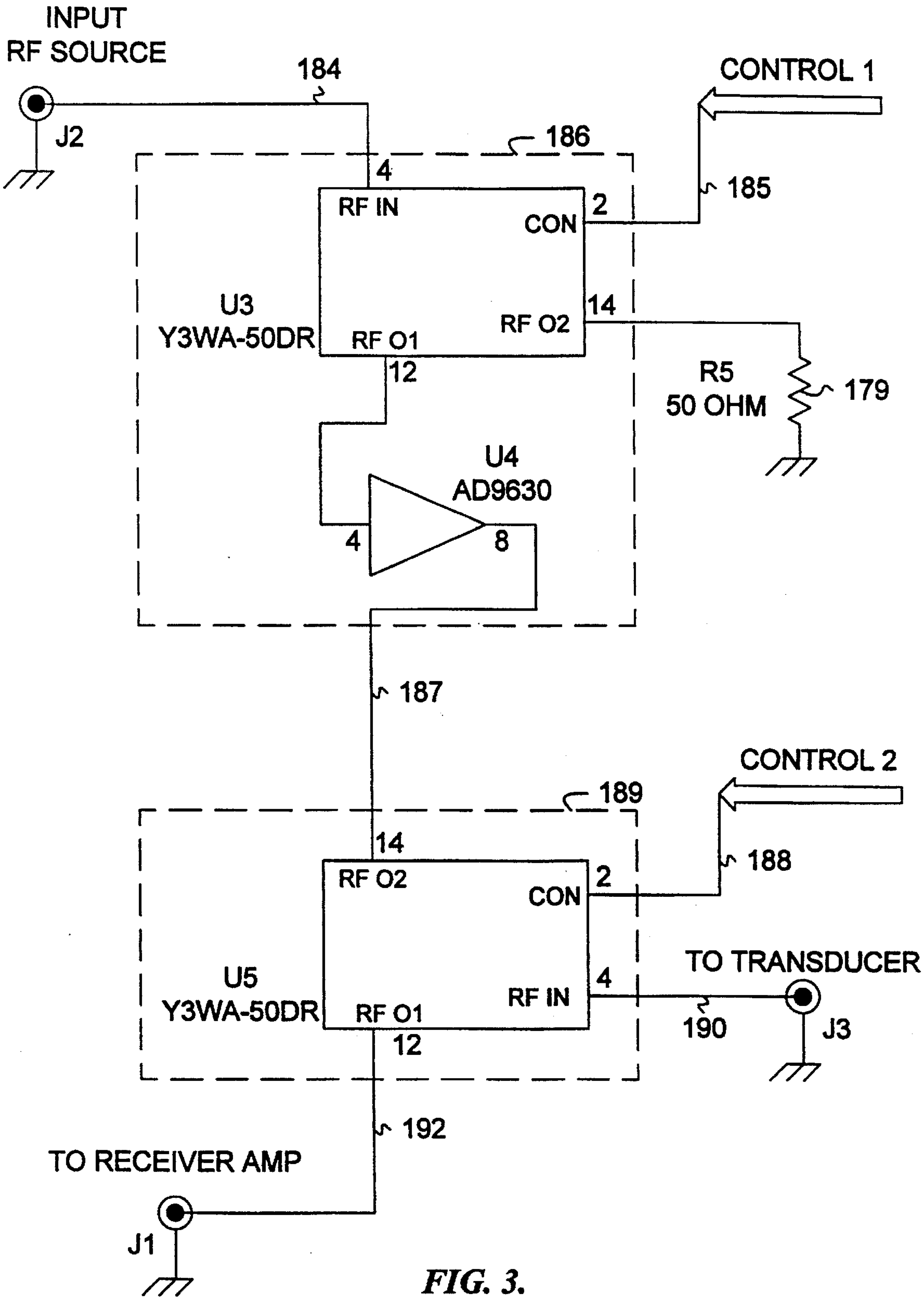
FIG. 3 is a schematic diagram of an embodiment of a gating circuit/switching circuit used in the ultrasonic transducer system of FIG. 1*a*.

FIG. 3 is a schematic diagram of an embodiment of a gating circuit/switching circuit used in the ultrasonic transducer system of FIG. 1*a*. "BNC"-type jack J2 couples tone signal 184 (the input radio-frequency source) to gating circuit 186. Gating circuit 186 is implemented using integrated circuits U3, a "Y3WA-50DR"-type switch chip capable of switching in less than 10 nanoseconds, and U4, an "AD9630"-type amplifier. Dummy load resistor 179 is a 50-ohm resistor, specified to match the load characteristics of integrated circuit U4. Switching circuit 189 is implemented using integrated circuit U5, also a "Y3WA-50DR"-type switch chip.

Figure 4:
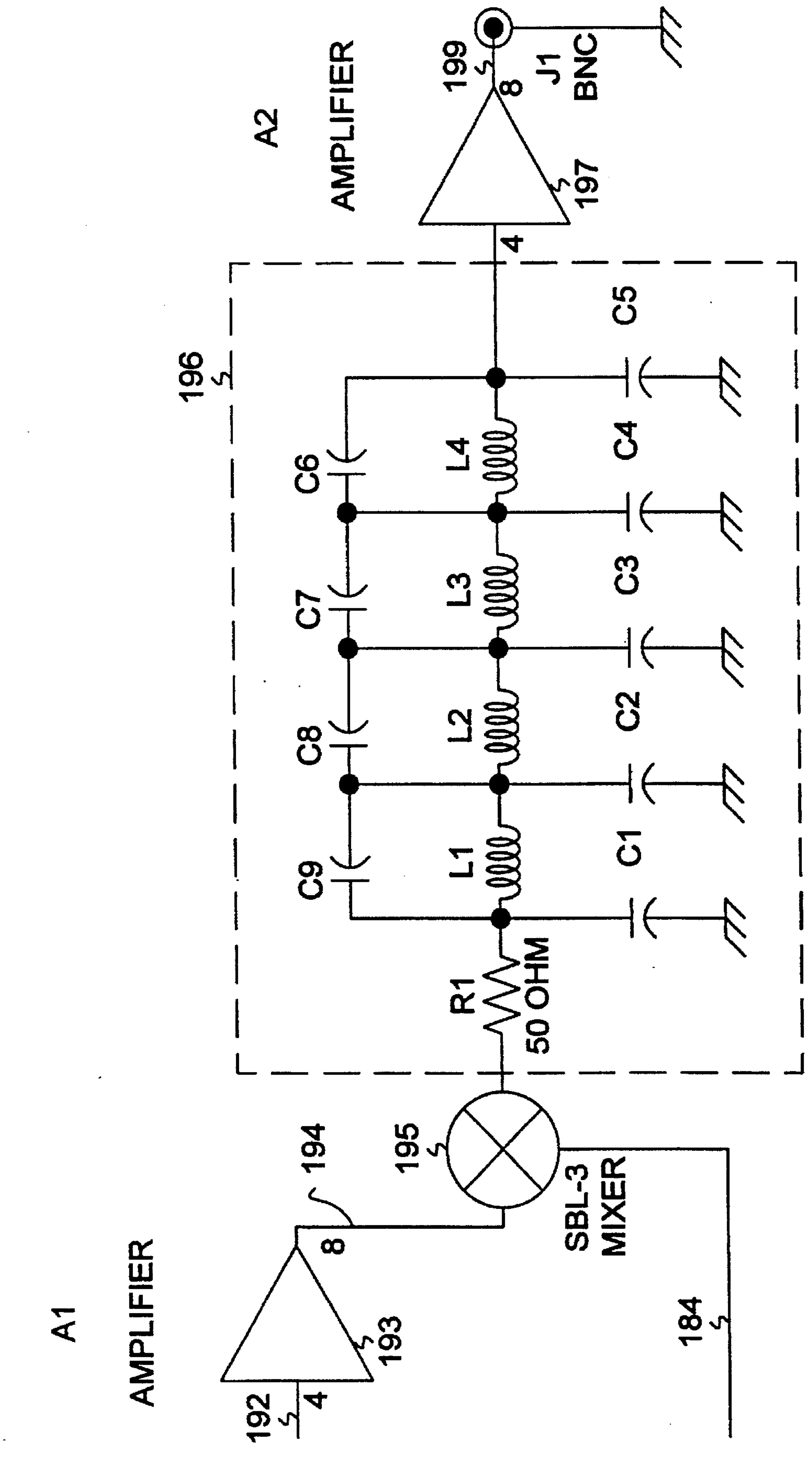
FIG. 4 is a schematic diagram of an embodiment of a demodulator mixer/low-pass filter used in the ultrasonic transducer system of FIG. 1*a*.

FIG. 4 is a schematic diagram of an embodiment of a demodulator (a mixer and low-pass filter) used in the ultrasonic transducer system of FIG. 1*a*. Amplifier 193 amplifies signal 192. Mixer 195 is implemented using an SBL-3 product-type mixer from Mini-Circuit Corp., PO Box 350166, Brooklyn, N.Y. 11235-0003, that is commercially available. Low-pass filter 196 is a fourth-order Butterworth filter. Amplifier 197 amplifies the output signal of low-pass filter 196. BNC jack J1 couples output signal 199.

Figure 5:
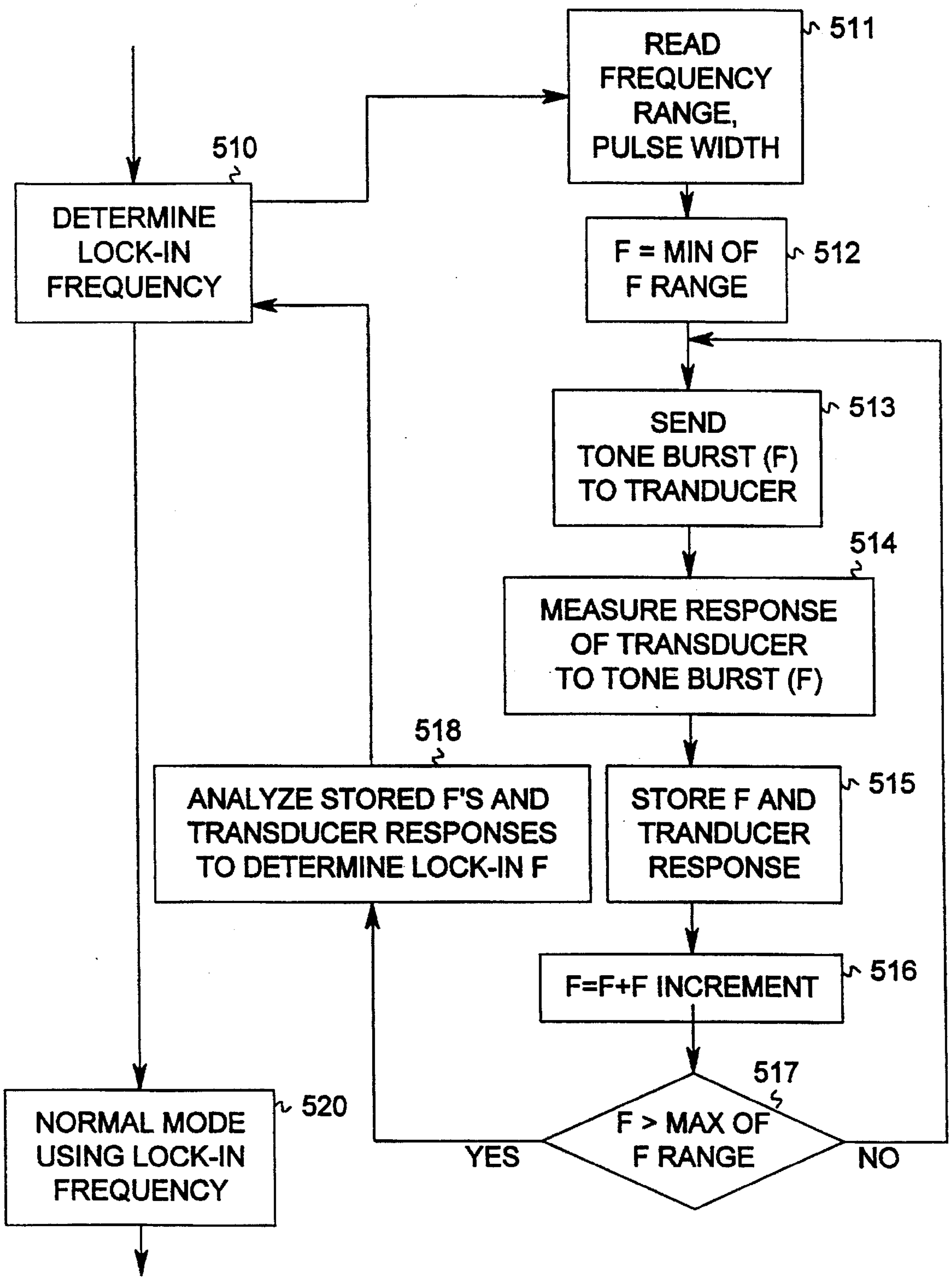
FIG. 5 is a flow-chart depicting the overall operation of the ultrasonic transducer system of FIG. 1*a*.

FIG. 5 is a flow-chart depicting the overall operation of a program which controls the ultrasonic transducer system of FIG. 1*a*. In one embodiment, the program is written in the C programming language, and executed from a computer program memory in controller 181. Block 510 represents operation in a first mode, wherein a lock-in frequency of transducer 191 is determined. Block 520 represents operation in a second mode, wherein the lock-in frequency of transducer 191 determined at block 510 is used to stimulate transducer 191. Block 510 comprises steps 511 through 518. Block 511 represents reading the input frequency range and pulse width to be used in the process of determining the lock-in frequency. In this particular embodiment, the input frequency range and pulse width are empirically derived for a particular type of transducer. The pulse width is chosen to be short enough that, using the subject medium of interest, the trailing edge of the pulse train has left the transducer before the echo from the leading edge of the pulse, having bounced off the closest feature of interest, returns to the transducer. The pulse is also chosen to be long enough to ensure that the spectral width of the excitation signal is sufficiently narrow to capture only one of the resonance modes of the transducer.

A typical ultrasonic transducer is a fairly complex device which exhibits multiple locally-resonant modes. If the transducer is excited, in the first mode, over a broad range of frequencies, it is likely that the method could "home in" on a mode that is not located close to the nominal frequency. Therefore, the method and apparatus are typically restricted to scan several KHz on either side of the stated nominal frequency of a commercially-available transducer. A range of 10 to 15% of the nominal frequency on either side was found to be reasonable in one embodiment.

Block 512 represents setting the tone signal 184 to the minimum frequency in the input range of frequencies to be used. At block 513, a tone burst at the set tone-signal frequency (having a duration equal to the set pulse width) is sent to transducer 191. At block 514, the response of transducer 191 to this electronic tone burst is measured. At block 515, the frequency set for tone signal 184 and the response measured from transducer 191 are stored in the computer program memory in controller 181. At block 516 the frequency of tone signal 184 is set to the frequency of the next channel (the frequency is incremented by the channel spacing of oscillator 183). If at 517, the frequency does not exceed the maximum frequency of the set frequency range, the control is passed back to step 513 to initiate a test at the new channel frequency; otherwise, control passes to block 518. At block 518, the responses stored in computer memory are examined to determine the optimal frequency for transducer 191; in an embodiment measuring the transducer voltage during a transmitted tone burst, the optimal frequency corresponds to the minimum voltage measured, and the lock-in frequency selected is that frequency corresponding to the minimum voltage measurement. Control then passes back through block 510 to block 520. Block 520 represents operation in a second mode (the normal operating mode), wherein the lock-in frequency of transducer 191 determined at block 510 is used to stimulate transducer 191. Transducer 191 is then used to receive the echoes from the interaction of the tone burst with specimen 170 and generate a received signal 192. This signal is then demodulated as described above in the discussion of FIG. 4, and is then displayed by conventional means.

It is to understood that the above description is intended to be illustrative, and not restrictive. The method for electronically driving an ultrasonic transducer described in the above embodiments of the invention use impedance measurement to determine a lock-in frequency for the transducer. Many other embodiments will be apparent to those of skill in the art upon reviewing the above description. For instance, rather than impedance measurement, an embodiment could utilize acoustic signal measurement. Also, a method suited for incrementally stepping through the frequency range of interest is described above, but a person skilled in the art could use a similar method in which frequencies are tested in a successive approximation sequence to first determine successively smaller ranges of frequencies to test subsequently. The scope of the invention should, therefore, be determined with reference to the appended claims, along with the full scope of equivalents to which such claims are entitled.

What is claimed is:

1. A method for electromagnetically driving an ultrasonic acoustic transducer, said method comprising the steps of:

operating in a first mode, wherein the step of operating in said first mode comprises the step of determining a lock-in frequency of said transducer, wherein the step of determining said lock-in frequency comprises the steps of:

exciting said transducer with a first electromagnetic tone burst at a first frequency, measuring a first response of said transducer to said first electromagnetic tone burst, exciting said transducer with a second electromagnetic tone burst at a second frequency, measuring a second response of said transducer to said second electromagnetic tone burst, and selecting said lock-in frequency based on said measured first and second responses; and operating in a second mode, wherein the step of operating in said second mode comprises the step of driving said transducer with an electromagnetic tone burst at said determined lock-in frequency.

2. The method according to claim 1, wherein:

the step of measuring said first response comprises the step of measuring the voltage response across said transducer as a result of exciting said transducer with said first tone burst;

the step of measuring said second response comprises the step of measuring the voltage response across said transducer as a result of exciting said transducer with said second tone burst;

the step of selecting a lock-in frequency comprises the step of choosing said first frequency as the lock-in frequency if said measured first voltage response is less than said measured second voltage response, and in the alternative choosing said second frequency as the lock-in frequency if said measured second voltage response is less than said measured first voltage response.

3. The method according to claim 1, wherein:

the step of measuring said first response comprises the step of measuring the current response into said transducer as a result of exciting said transducer with said first tone burst;

the step of measuring said second response comprises the step of measuring the current response into said transducer as a result of exciting said transducer with said second tone burst;

the step of selecting a lock-in frequency comprises the step of choosing said first frequency as the lock-in frequency if said measured first current response is greater than said measured second current response, and in the alternative choosing said second frequency as the lock-in frequency if said measured second current response is greater than said measured first current response.

4. The method according to claim 1, wherein:

the step of measuring said first response comprises the step of measuring the acoustic output response from said transducer as a result of exciting said transducer with said first tone burst;

the step of measuring said second response comprises the step of measuring the acoustic output response from said transducer as a result of exciting said transducer with said second tone burst;

the step of selecting a lock-in frequency comprises the step of choosing said first frequency as the lock-in frequency if said measured first acoustic output response is greater than said measured second acoustic output response, and in the alternative choosing said second frequency as the lock-in frequency if said measured second acoustic output response is greater than said measured first acoustic output response.

5. The method according to claim 1, wherein:

the step of measuring said first response comprises the step of having said transducer in situ;

the step of measuring said second response comprises the step of having said transducer in situ; and the step of operating in said second mode comprises the step of having said transducer in situ.

6. The method according to claim 1, further including the steps of:

exciting said transducer with a third electromagnetic tone burst at a second frequency;

measuring a third response of said transducer to said third electromagnetic tone burst; and wherein the step of selecting the lock-in frequency includes the step or determining a local minimum or local maximum of response versus frequency.

7. The method according to claim 1, wherein the step of operating in said second mode further comprises the step of receiving acoustic echos of the tone burst burst at said determined lock-in frequency.

8. An electromagnetic driving system for an ultrasonic transducer, said system comprising:

means for exciting said transducer with a first electromagnetic tone burst at a first frequency;

means for measuring a first response of said transducer to said first tone burst;

means for exciting said transducer with a second electromagnetic tone burst at a second frequency;

means for measuring a second response of said transducer to said second tone burst; and means for selecting a lock-in frequency based on said measured first and second responses.

9. The system according to claim 8, wherein:

the means for measuring said first response comprises the means for measuring the voltage response across said transducer as a result of exciting said transducer with said first tone burst;

the means for measuring said second response comprises the means for measuring the voltage response across said transducer as a result of exciting said transducer with said second tone burst;

the means for selecting a lock-in frequency comprises means for choosing said first frequency as the lock-in frequency if said measured first voltage response is less than said measured second voltage response, and in the alternative choosing said second frequency as the lock-in frequency if said measured second voltage response is less than said measured first voltage response.

10. The system according to claim 8, wherein:

the means for measuring said first response comprises the means for measuring the current response into said transducer as a result of exciting said transducer with said first tone burst;

the means for measuring said second response comprises the means for measuring the current response into said transducer as a result of exciting said transducer with said second tone burst;

the means for selecting a lock-in frequency comprises means for choosing said first frequency as the lock-in frequency if said measured first current response is greater than said measured second current response, and in the alternative choosing said second frequency as the lock-in frequency if said measured second current response is greater than said measured first current response.

11. The system according to claim 8, wherein:

the means for measuring said first response comprises the means for measuring the acoustic output response from said transducer as a result of exciting said transducer with said first tone burst;

the means for measuring said second response comprises the means for measuring the acoustic output response from said transducer as a result of exciting said transducer with said second tone burst;

the means for selecting a lock-in frequency comprises means for choosing said first frequency as the lock-in frequency if said measured first acoustic output response is greater than said measured second acoustic output response, and in the alternative choosing said second frequency as the lock-in frequency if said measured second acoustic output response is greater than said measured first acoustic output response.

12. The system according to claim 8, further including:

means for driving the transducer with a tone burst at the selected lock-in frequency; and means for receiving an echo from the a tone burst at the selected lock-in frequency.

13. A method for determining the lock-in frequency of an electromagnetically-driven ultrasonic acoustic transducer, said method comprising the steps of:

coupling a first signal of a first frequency to said transducer, wherein said first signal is a first electromagnetic tone burst at said first frequency;

measuring a first response of said transducer to said first signal;

coupling a second signal of a second frequency to said transducer;

measuring a second response of said transducer to said second signal; and selecting a lock-in frequency based on said measured first and second responses.

14. The method according to claim 13 wherein:

said second signal is a second electromagnetic tone burst at said second frequency.

15. A method for electromagnetically driving an ultrasonic acoustic transducer, said method comprising the steps of:

operating in a first mode, wherein the step of operating in said first mode comprises the step of determining a lock-in frequency of said transducer, wherein the step of determining said lock-in frequency comprises the steps of:

exciting said transducer with an electromagnetic signal swept across a range of frequencies;

measuring a first response of said transducer to said electromagnetic signal at a first frequency within said range of frequencies;

measuring a second response of said transducer to said electromagnetic signal at a second frequency within said range of frequencies; and selecting said lock-in frequency based on said measured first and second responses; and operating in a second mode, wherein the step of operating in said second mode comprises the step of driving said transducer with an electromagnetic tone burst at said determined lock-in frequency.

16. The method according to claim 15, wherein:

the step of measuring said first response comprises the step of measuring the voltage response across said transducer as a result of exciting said transducer with said electromagnetic signal to said transducer at said first frequency;

the step of measuring said second response comprises the step of measuring the voltage response across said transducer as a result of exciting said transducer with said electromagnetic signal to said transducer at said second frequency;

the step of selecting a lock-in frequency comprises the step of choosing said first frequency as the lock-in frequency if said measured first voltage response is less than said measured second voltage response, and in the alternative choosing said second frequency as the lock-in frequency if said measured second voltage response is less than said measured first voltage response.

17. The method according to claim 15, wherein:

the step of measuring said first response comprises the step of measuring the current response into said transducer as a result of exciting said transducer with said electromagnetic signal to said transducer at said first frequency;

the step of measuring said second response comprises the step of measuring the current response into said transducer as a result of exciting said transducer with said electromagnetic signal to said transducer at said first frequency;

the step of selecting a lock-in frequency comprises the step of choosing said first frequency as the lock-in frequency if said measured first current response is greater than said measured second current response, and in the alternative choosing said second frequency as the lock-in frequency if said measured second current response is greater than said measured first current response.

18. The method according to claim 15, wherein:

the step of measuring said first response comprises the step of measuring the acoustic output response from said transducer as a result of exciting said transducer with said electromagnetic signal to said transducer at said first frequency;

the step of measuring said second response comprises the step of measuring the acoustic output response from said transducer as a result of exciting said transducer with said electromagnetic signal to said transducer at said first frequency;

the step of selecting a lock-in frequency comprises the step of choosing said first frequency as the lock-in frequency if said measured first acoustic output response is greater than said measured second acoustic output response, and in the alternative choosing said second frequency as the lock-in frequency if said measured second acoustic output response is greater than said measured first acoustic output response.

19. The method according to claim 15, wherein:

the step of measuring said first response of said transducer to said electromagnetic signal at said first frequency comprises the step of having said transducer in situ;

the step of measuring said second response of said transducer to said electromagnetic signal at said second frequency comprises the step of having said transducer in situ; and the step of operating in said second mode comprises the step of having said transducer in situ.

20. The method according to claim 15, wherein the step of operating in said second mode comprises the step of receiving acoustic echos of the tone burst burst at said determined lock-in frequency.

21. An electromagnetic-driving system for an ultrasonic transducer, said system comprising:

means for exciting said transducer with an electromagnetic signal swept across a range of frequencies;

means for measuring a first response of said transducer to said electromagnetic signal at a first frequency;

means for measuring a second response of said transducer to said electromagnetic signal at a second frequency;

means for selecting a lock-in frequency based on said measured first and second responses;

means for driving said transducer with an electromagnetic tone burst at said selected lock-in frequency; and means for receiving acoustic responses from said electromagnetic tone burst at said selected lock-in frequency.

22. The system according to claim 21, wherein:

the means for measuring said first response comprises the means for measuring the voltage response across said transducer as a result of exciting said transducer with said electromagnetic signal to said transducer at said first frequency;

the means for measuring said second response comprises the means for measuring the voltage response across said transducer as a result of exciting said transducer with said electromagnetic signal to said transducer at said second frequency;

the means for selecting a lock-in frequency comprises means for choosing said first frequency as the lock-in frequency if said measured first voltage response is less than said measured second voltage response, and in the alternative choosing said second frequency as the lock-in frequency if said measured second voltage response is less than said measured first voltage response.

23. The system according to claim 21, wherein:

the means for measuring said first response comprises the means for measuring the current response into said transducer as a result of exciting said transducer with said electromagnetic signal to said transducer at said first frequency;

the means for measuring said second response comprises the means for measuring the current response into said transducer as a result of exciting said transducer with said electromagnetic signal to said transducer at said second frequency;

the means for selecting a lock-in frequency comprises means for choosing said first frequency as the lock-in frequency if said measured first current response is greater than said measured second current response, and in the alternative choosing said second frequency as the lock-in frequency if said measured second current response is greater than said measured first current response.

24. The system according to claim 21, wherein:

the means for measuring said first response comprises the means for measuring the acoustic output response from said transducer as a result of exciting said transducer with said electromagnetic signal to said transducer at said first frequency;

the means for measuring said second response comprises the means for measuring the acoustic output response from said transducer as a result of exciting said transducer with said electromagnetic signal to said transducer at said second frequency;

the means for selecting a lock-in frequency comprises means for choosing said first frequency as the lock-in frequency if said measured first acoustic output response is greater than said measured second acoustic output response, and in the alternative choosing said second frequency as the lock-in frequency if said measured second acoustic output response is greater than said measured first acoustic output response.

25. A method for determining the lock-in frequency of an electromagnetically-driven ultrasonic acoustic transducer, said method comprising the steps of:

exciting said transducer with a tone-burst signal from a tone-burst signal generator at each one of a plurality of frequencies;

characterizing the frequency response of said transducer to said tone burst signal; and selecting a lock-in frequency based on said characterized frequency response.

26. The method according to claim 25, wherein the step of exciting said transducer with a tone-burst signal from a tone-burst signal generator at each one of a plurality of frequencies includes a series of individual tone bursts at each one of at least three different frequencies; and wherein the step of characterizing the frequency response includes the step or determining a local minimum or local maximum of response versus frequency.

27. The method according to claim 25, further comprising the steps of:

driving the transducer with a tone burst at the selected lock-in frequency; and receiving an echo from the a tone burst at the selected lock-in frequency.

* * * * *